United States Patent
Amtmann et al.

(10) Patent No.: US 7,604,170 B2
(45) Date of Patent: Oct. 20, 2009

(54) PORTABLE DEVICE WITH AN ACTIVE COMMUNICATION STATION CONFIGURATION AND A PASSIVE DATA CARRIER CONFIGURATION

(75) Inventors: Franz Amtmann, Graz (AT); Klemens Breitfuss, Voitsberg (AT); Holger Kunkat, Graz (AT); Reinhard Meindl, Graz (AT); Stefan Posch, Graz (AT)

(73) Assignee: NXP B.V., Eindhoven (NL)

( * ) Notice: Subject to any disclaimer, the term of this patent is extended or adjusted under 35 U.S.C. 154(b) by 328 days.

(21) Appl. No.: 11/654,995

(22) Filed: Jan. 17, 2007

(65) Prior Publication Data

US 2007/0114282 A1 May 24, 2007

Related U.S. Application Data

(63) Continuation-in-part of application No. 10/507,947, filed on Mar. 21, 2005, now Pat. No. 7,185,813.

(51) Int. Cl.
*G06K 7/08* (2006.01)
(52) U.S. Cl. .................. 235/451; 235/449
(58) Field of Classification Search ............ 235/492, 235/451, 380, 449; 369/47.1; 340/501, 500, 340/539.11; 703/13

See application file for complete search history.

(56) References Cited

U.S. PATENT DOCUMENTS

| 4,837,556 | A | * | 6/1989 | Matsushita et al. ......... 369/47.1 |
| 5,841,119 | A | * | 11/1998 | Rouyrre et al. .............. 235/380 |
| 6,462,652 | B1 | * | 10/2002 | McCuen et al. .............. 340/501 |
| 6,659,343 | B2 | * | 12/2003 | Tanaka ....................... 235/380 |
| 6,832,182 | B1 | * | 12/2004 | Wilson, Jr. ................... 703/13 |
| 2005/0077356 | A1 | * | 4/2005 | Takayama et al. ........... 235/451 |
| 2006/0208066 | A1 | * | 9/2006 | Finn et al. ................... 235/380 |

* cited by examiner

*Primary Examiner*—Thien M. Le
*Assistant Examiner*—Sonji Johnson

(57) ABSTRACT

A portable device includes an active device (communication station) configuration for contactless communication with at least one external data carrier and a passive device (data carrier) configuration for contactless communication with at least one external communication station. A detection circuit is provided to detect the presence of an external data carrier and/or the presence of an external communication station in a communication zone of the internal active device configuration and/or the internal passive device configuration. An activation circuit is coupled to the detection circuit to enable one of the two configurations based on the detection result.

17 Claims, 2 Drawing Sheets

PORTABLE DEVICE WITH AN ACTIVE COMMUNICATION STATION CONFIGURATION AND A PASSIVE DATA CARRIER CONFIGURATION

This invention is a Continuation-In-Part of U.S. patent application Ser. No. 10/507,947, filed 21 Mar. 2005 now U.S. Pat. No. 7,185,813 and incorporated by reference herein, and claims priority of European Patent Application EP 02/100270, filed 18 Mar. 2002.

The invention relates to a portable device that includes a communication station configuration that is provided and designed for active contactless communication with at least one passive data carrier external to the portable device and a data carrier configuration for passive contactless communication with at least one active communication station external to the portable device.

For the purposes of this application, a passive communication mode is one in which one of the devices responds to signals from the other device via load modulation of the received signal. An active communication mode is one in which both devices transmit substantially independently, by generating their own RF field. An active device may initiate communications with another active device or with a passive device, and both active and passive devices may respond to communications initiated by an active device. An active device is commonly known as a communication station, and a passive device is commonly known as a data carrier.

A portable device that is designed to operate as an active communication station is known, for example, from patent document DE 199 17 223 A1. The known portable device is a portable read device by means of which files may be easily located. The known read device comprises a communication station configuration by means of which characteristic data stored in passive transponders, i.e. data carriers, may be read out and stored in the files during performance of a communication process, and thereafter display information corresponding to this stored characteristic data can be displayed on a display device of the portable device. Although it is possible to effect simple and reliable locating of files with the known portable device to display the characteristic data, the known portable device offers only this functionality and therefore allows only such location.

It is an object of the invention to improve a portable device with regard to its possible functions, i.e. to provide at least two functionalities and to ensure simple, reliable selection of the required or desired functionality.

To achieve the above-mentioned object, a portable device is provided that can selectively function as an active device, and as a passive device. When configured as an active communication station, the device may initiate communications or respond to communications from an external initiator. The initiator of communications sets the desired communications mode. Upon receipt of communication initiated by an external device, the portable device will enter the mode (passive or active) directed by the external initiator.

By providing the features according to the invention, a portable device of relatively low complexity may be provided which offers both the functionality of a communication station and the functionality of a data carrier and with which the functionality desired in each case may be selected simply and automatically, and consequently very reliably.

In a preferred embodiment, the detection of an external data carrier and detection of an external communication station includes a periodic scan for transmissions. In this way, a detection is ensured which is very simple with regard to circuitry and moreover very reliable and unambiguous.

Also in a preferred embodiment, the portable device includes a display that is configured to allow for data content stored in a data carrier external to the portable device to be displayed after being read out by the portable device, which is useful and convenient for a user of the portable device and such an external data carrier.

It is advantageous for the portable device to take the form of a cell phone or a Personal Digital Assistant (PDA). This advantageously ensures that the functionalities of a cell phone or a Personal Digital Assistant are extended by advantageous additional functionalities. Such a cell phone or such a Personal Digital Assistant may be used to display the data content of known card-form data carriers, such as credit cards, health service cards, and cards for other purposes, and also as an electronic ticket and for access control purposes and as an automobile immobilizer.

It is also advantageous, however, for the portable device to take the form of a card-form data carrier. This advantageously ensures that a card-form data carrier constructed according to the invention, which is provided with a display configuration, may additionally also be used to enable the data content of a further data carrier to be read out by the portable device in the active device configuration, and subsequently displayed. This provides the considerable advantage that a user with a plurality of personal cards requires only a single personal card designed according to the invention with a display configuration and the data contents of all the other cards may be displayed by the portable device. It should be mentioned that card-form data carriers with a display are known per se, for example from patent document DE 296 02 834 U1.

In addition to being able to display the data from external data carriers, the portable device is preferably configured to subsequently enable the portable device to use the data in the internal passive (data carrier) mode, to effectively emulate each of the external data carriers. Advantageously, this would allow a cell phone, PDA, or other portable device with internal memory to replace the variety of data carriers that a user may use.

The above mentioned aspects of the invention and further aspects thereof emerge from the examples of embodiment described below and are explained with reference to these examples of embodiment.

The invention will be further described with reference to examples of embodiments shown in the drawings to which, however, the invention is not restricted.

Figure 1:
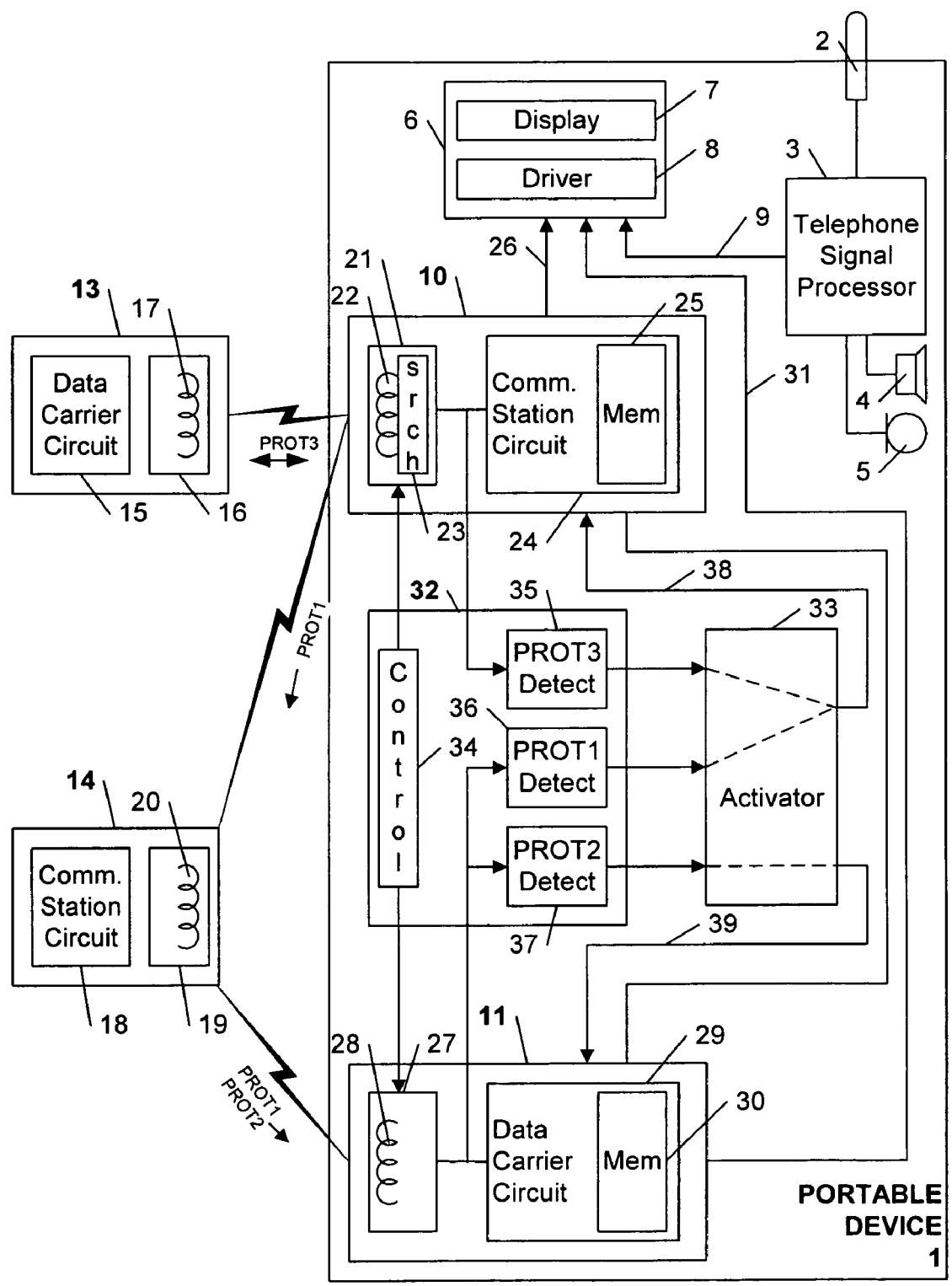
FIG. 1 is a highly schematic representation, in the form of a block diagram, of a portion, essential in the present context, of a portable device according to a first example of embodiment of the invention.

FIG. 1 shows a portable device 1 which in the present case takes the form of a cell phone 1. The cell phone 1 comprises an antenna 2 by means of which telephone signals can be received and sent. Moreover, the cell phone 1 comprises a telephone signal processing circuit 3 which is connected to the antenna 2 and by means of which telephone signals which have been received or are to be sent may be processed. A loudspeaker 4 for reproducing received telephone signals is connected to the telephone signal processing circuit 3. In addition, a microphone 5 is connected to the telephone signal processing circuit 3, by means of which microphone 5 telephone signals to be processed in the telephone signal processing circuit 3 and subsequently to be sent can be generated.

The cell phone 1 further comprises a display configuration 6. The display configuration 6 consists substantially of a display 7 and a driver circuit 8, by means of which data signals to be displayed may be processed and subsequently fed to the display 7 for display purposes. In the present case, the display 7 is typically an LCD display, although any other suitable display device may be provided as the display configuration 6.

The display configuration 6 is connected to the telephone signal processing circuit 3 via a schematically illustrated connection 9. This makes it possible for signals received by the telephone signal processing circuit 3 to be fed after processing thereof in the telephone signal processing circuit 3 to the driver circuit 8, whereupon the data represented by these signals may be displayed by the display 7.

The cell phone 1 particularly advantageously comprises both an active device configuration 10 and a passive device configuration 11.

The active device configuration 10 is provided and designed for contactless communication with at least one data carrier 13 external to the cell phone 1, and in this case also for contactless communication with at least one communication station 14 external to the cell phone 1. Preferably, the active device configuration 10 and the passive device configuration 11 provide near field communications in accordance with ISO/IEC Standard 18092 "Information technology—Telecommunications and information exchange between systems—Near Field Communications—Interface and Protocol (NFCIP-1)".

The external data carrier 13 comprises an external data carrier (passive) circuit 15 in the form of an integrated circuit, which data carrier circuit 15 cooperates with transmitter 16, which transmitter 16 comprises a transmission coil 17. The data carrier circuit 15 is configured to provide data input to the transmitter 16; the transmitter 16 is configured to load modulate the received signal on the coil 17 based on the data input, which modulation will be detected by the coil 22 in active device configuration 10.

The passive device configuration 11 is provided and designed for contactless communication with at least one communication station 14 external to the cell phone 1. The external communication station 14 comprises an external communication station (active) circuit 18 and transmitter 19 cooperating with the external communication circuit 18, which transmitter 19 likewise comprises a transmission coil 20. The communication circuit 18 is configured to actively drive the transmission coil 20, with its own independently generated RF field.

The internal active device configuration 10 contained in the cell phone 1 comprises first transceiver 21, which comprises a transmission coil 22. The transceiver 21 is configured to actively drive the transmission coil 22, with its own independently generated RF field. In the present case, the first transceiver 21 additionally also comprises a search signal generation stage 23 by means of which a search signal can be generated. Furthermore, the internal active device configuration 10 comprises an internal communication station circuit 24 that is provided and designed to process signals received or to be sent by means of the first transceiver 21.

The internal communication station circuit 24 here takes the form of an integrated circuit and comprises, in addition to a plurality of other components, a first memory 25. In the first memory 25 there are stored, inter alia, data received by the active device configuration 10 from external data carriers 13 or from external communication stations 14. The memory 25 may also store data received from the telephone processor 3, or the memory 30, for communication via the transceiver 21. The internal communication station circuit 24 is connected to the driver circuit 8 of the display configuration 6 via a schematically illustrated connection 26. This allows data or data contents contained in the internal communication station circuit 24 and in particular in the first memory 25 to be supplied to the driver circuit 8 of the display configuration 6 and subsequently to be displayed by the display 7.

The internal passive device configuration 11 comprises second transceiver 27 which likewise comprises a transmission coil 28. The transceiver 27 is configured to load modulate the received signal from the external communication station 14, thereby emulating the performance of a passive data carrier. To the second transceiver 27 there is connected an internal data carrier circuit 29 which is provided and designed to process signals received or to be sent by the second transceiver 27. The internal data carrier circuit 29 comprises, in addition to a plurality of assemblies, a second memory 30, which preferably takes the form of a non-volatile memory or of a fixed programmed memory and in which, inter alia, data or data contents may be stored which have been received from the external communication station 14, from the memory 25 of the internal active device configuration 10, or from the telephone processor 3. The data in the memory 25 may be selectively used to provide the data input to the transceiver 27 for load modulating the received signal from the external communication station 14. The internal data carrier circuit 29 is also connected to the driver circuit 8 of the display configuration 6 via a schematically illustrated connection 31, whereby it is possible for data or data contents contained in the internal data carrier circuit 29 and in particular in the second memory 30 thereof to be forwarded to the driver circuit 8 and subsequently displayed by the display means 7. In an alternative embodiment, the connection 31 may also be dispensed with if no display functionality is required or desired for the passive device configuration 11.

The following should also be noted with regard to the contactless communications or communication modes which are possible for external data carriers 13 and external communication stations 14 in the case of the cell phone 1.

The external communication station 14 may communicate with the internal active device configuration 10 using a first protocol PROT1, wherein according to the first protocol PROT1 a first start signal is provided at the start thereof and, when the first protocol PROT1 is used, data or data signals are transmitted by means of at least a first coding mode and by means of a first modulation mode. In this example, PROT1 corresponds to a directive from the communication station 14 to communicate using an active communication mode; alternatively, if the portable device 1 initiates communication, PROT1 corresponds to a directive from the portable device 1 to the communication station 14 to communicate using an active communication mode.

The external communication station 14 may communicate with the internal passive device configuration 11 using a second protocol PROT2, wherein according to the second protocol PROT2 a second start signal is provided at the start thereof and, when the second protocol is used, data or data signals for transmission are modulated in accordance with at least a second coding mode and in accordance with a second modulation mode. In this example, PROT2 corresponds to a directive from the communication station 14 to communicate in a passive communication mode; i.e. by load-modulating the signal received from the communication station 14.

In the event of communication between an external data carrier 13 and the internal active device configuration 10, communication takes place using a third protocol PROT3, wherein, when the third protocol is used, data or data signals for transmission are transmitted in accordance with at least a third coding mode and in accordance with a third modulation mode. Because the external data carrier 13 is a passive device, this protocol is established by the active device configuration of the portable device 1. In this example, PROT3 corresponds to a directive from the portable device 1 to the external data carrier 13 to communicate using a passive communication mode.

As can be seen, the portable device 1 can control which device is the target device for an initiated communication, by directing the appropriate communication mode. That is, if portable device 1 issues a directive to communicate in the active mode, only the communication station 14 can respond. In like manner, if the portable device 1 issues a directive to communicate in the passive mode, only the data carrier 13 can respond.

The cell phone 1 advantageously comprises detector 32, provided and designed to detect at least one external data carrier 13 located in a communication zone suitable for a contactless communication in an active communication mode, and to detect at least one external communication station 14 located in a communication zone suitable for a contactless communication in an active or passive communication mode. The design of the detector 32 is examined in more detail below.

The cell phone 1 advantageously further comprises activator 33 cooperating with the detector 32, which activator 33 cooperates both with the internal active device configuration 10 and with the internal data carrier configuration 11, and by which means 33 one of the two configurations 10 and 11 can be activated as a function of the detection result supplied in each case by the detector 32, such that, depending on the detection result, either the internal active device configuration 10 or the internal passive device configuration 11 is activated and consequently set in operation for full communication with at least one external data carrier 13 or with at least one external communication station 14.

The detector 32 and the activator 33 are preferably provided, together with the internal active device configuration 10 and the internal passive device configuration 11, on the circuit board of the cell phone 1.

The detector 32 comprises controller 34 that can act in a controlling manner via respective control connections 35 and 36 on the first transceiver 21 and the second transceiver 27, thereby allowing the first transceiver 21 and the second transceiver 27 to be activated automatically.

The detector 32 additionally comprises a PROT3 detection stage 35 that is connected to transceiver 21 and by means of which the receipt of a response signal transmitted to the internal active device configuration 10 in response to a search signal by at least one external data carrier 13 can be detected. As noted above, the external data carrier 13 effects this response by load modulation of the search signal that is transmitted by the transceiver 21. If such a response signal is detected by the first detection stage 35, the first detection stage 35 outputs a corresponding control signal to the activator 33.

The detector 32 additionally comprises a PROT3 detection stage 36 and a PROT2 detection stage 37, which are both connected to transceiver 27.

The PROT1 detection stage 36 is provided and designed to detect a first start signal arising at the start of the first protocol PROT1 from an external communication station 14 upon use of the first protocol PROT1. As noted above, in this example, the start signal of the first protocol PROT1 corresponds to a directive by the external communication station 14 to communicate in an active communication mode. That is, PROT1 is the mode that communication stations use for peer-to-peer communications with each other. If the PROT1 detection stage 36 detects a first start signal, the second detection stage 36 outputs a corresponding control signal to the activator 33.

The PROT2 detection stage 37 is provided and designed to detect a second start signal arising at the start of the second protocol PROT2 in the event of communication with an external communication station 14 when the second protocol PROT2 is used. As noted above, in this example, the start signal of the second protocol PROT2 corresponds to a directive by the external communication station 14 to communicate in a passive communication mode. That is, PROT2 is the mode that communication stations use for master-slave communications with a passive data carrier. If the third detection stage 37 detects such a second start signal, the third detection stage 37 outputs a corresponding control signal to the activator 33.

Activator 33 enables the internal active device configuration 10 via a control connection 38 if either protocol PROT1 or PROT3 is detected; that is, if a passive data carrier is detected, or if a communication station is seeking peer-to-peer communication with another communication station, the portable device is configured to operate in the active device configuration 10, emulating a communication system.

Activator 33 enables the internal passive device configuration 11 via a control connection 39 upon detection of protocol PROT2; that is, if a communication station is seeking master-slave communication with a passive data carrier, the portable device is configured to operate in the passive device configuration 11, emulating a data carrier.

The mode of operation of the cell phone 1 with regard to the internal communication configuration 10 and the internal passive device configuration 11 is explained further below.

In the cell phone 1, the controller 34 ensures a "polling" operation of the first transceiver 21 and the second transceiver 27. This means that the two transceivers 21 and 27 are activated by the controller 34 in succession in each case for a given period of time, for example, 100 msec in each case.

When the first transceiver 21 is activated, this results in the search signal generating stage 23 transmitting a search signal. If at least one external data carrier 13 is located in a communication zone suitable for a contactless communication connection, this results in said at least one external data carrier 13 receiving the search signal and consequently generating a response signal via load modulation of the search signal. The response signal is received by the still activated first transceiver 21 and subsequently fed to the PROT3 detection stage 35 of the detector 32. The response signal is detected by the PROT3 detection stage 35, which results in communicating a corresponding control signal to the activator 33. This in turn has the consequence that the activator 33 enables, via the control connection 38, the entire internal active device configuration 10, such that full communication is subsequently enabled between the internal active device configuration 10 and all the external data carriers 13 located in a communication zone suitable for a contactless communication connection.

When the controller 34 activates the second transceiver 27, this has the consequence that signals output from at least one external communication station 14 located in a communication zone suitable for a contactless communication, either according to the first protocol PROT1 or according to the second protocol PROT2, are received by the second transceiver 27. The communication station 14 outputs of its own volition signals according to either the first protocol PROT1 (peer-to-peer) or the second protocol PROT2 (master-slave). The signals received in each case are forwarded by the second transceiver 27 to the two detection stages 36 and 37 for the two start signals. Depending on which start signal has been received, the received start signal is detected by the relevant detection stage 36 or 37.

If a first start signal has been received, the PROT1 detection stage 36 outputs a corresponding control signal to the activator 33, such that communication operation is subsequently enabled between at least one external communication station 14 and the internal active device configuration 10 using the first protocol PROT1 (peer-to-peer).

If, on the other hand, a second start signal has been received, this start signal is detected by the PROT2 detection stage 37, a corresponding control signal is provided to the activator 33, which enables the internal passive device configuration 11 via the control connection 39. In this manner, communication is subsequently enabled according to the second protocol PROT2 (master-slave) between at least one external communication station 14 and the internal passive device configuration 11.

By enabling communication between an external communication station 14 and the internal passive device configuration 11, it is possible, for example, to read out authorization data from the second memory 30 for use of a means of public transport and to transmit it to the external communication station 14, such that in this case the cell phone fulfills the function of an electronic ticket. It goes without saying that a plurality of other functionalities is similarly possible due to communication between an external communication station 14 and the internal passive device configuration 11, for example access authorization to a medical database may be provided for the owner of the cell phone 1 by means of the internal passive device configuration 11. That is, the portable device 1 can selectively operate as a variety of data carriers, eliminating the need for the user to carry multiple discrete data carriers.

Conversely, by enabling communication between an external data carrier 13 and the internal active device configuration 10, it is possible, for example, to read out data content stored in the external data carrier 13 by means of the internal active device configuration 10 and to store it intermediately in the first memory 25 and subsequently to display it on the display 7 of the display configuration 6. This provides the substantial advantage to a user of the cell phone 1, who is also a user of a plurality of external data carriers 13, for example credit cards, insurance cards, and similar data carriers, of being able to display and consequently examine the respective current data contents of his/her external data carriers 13 simply through the display 7 of the cell phone 1. This also allows a user to store the data read from the external data carriers 13 into the memory 30, for subsequent use in the passive device configuration 11 for selectively operating as each of these read external data carriers 13.

Figure 2:
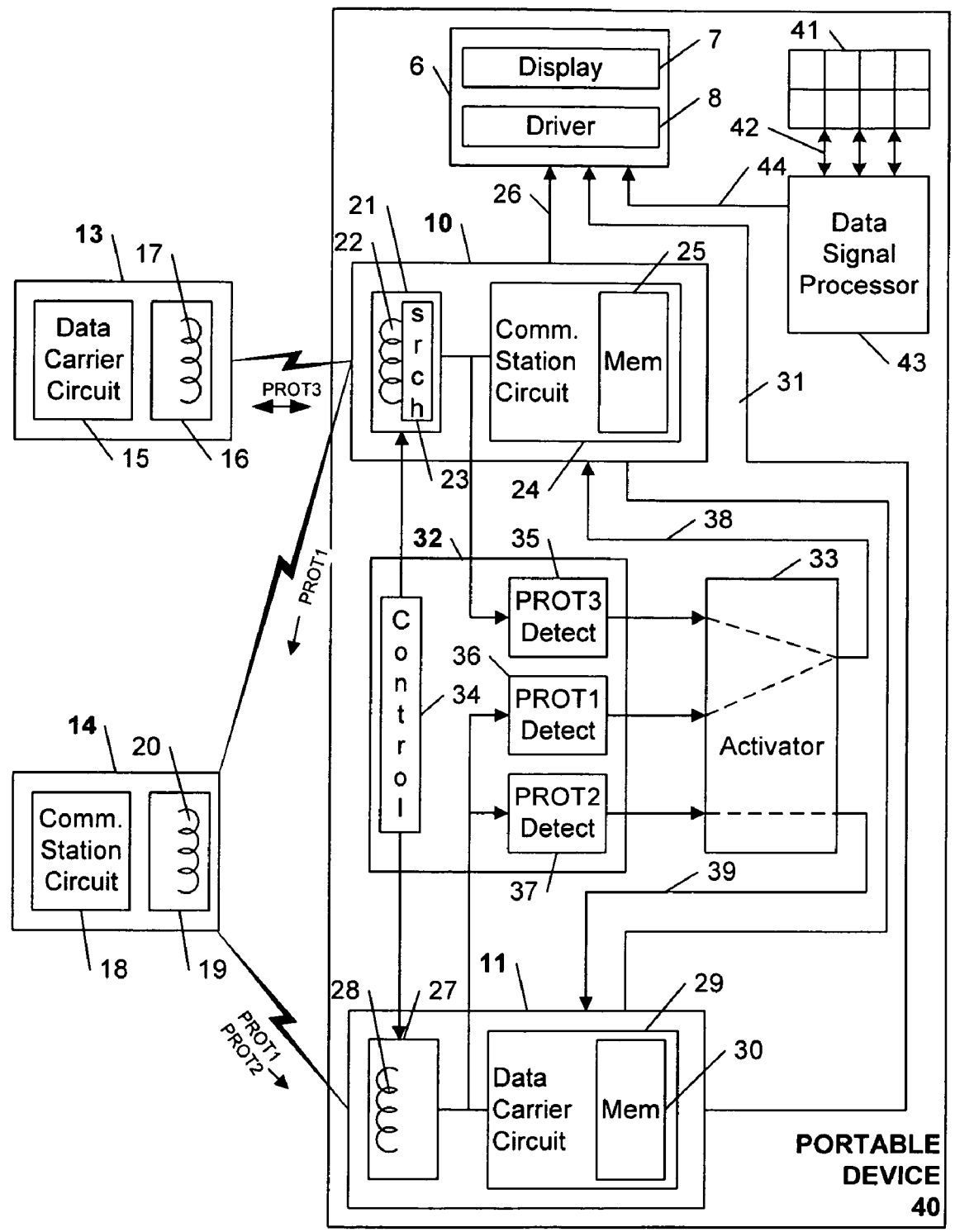
FIG. 2 shows, analogously to FIG. 1, a portable device according to a second example of embodiment of the invention.

FIG. 2 shows a further portable device 40. The portable device 40 is a credit card 40. The credit card 40 comprises for the most part circuitry which is virtually identical to that of the portable device 1 described above with reference to FIG. 1, i.e. the cell phone 1. However, the difference with the cell phone 1 is that the credit card 40 does not have an antenna 2, a telephone signal processing circuit 3, a loudspeaker 4, or a microphone 5, but rather the credit card 40 comprises a contact field 41 according to the known international standard, which is connected to a data signal processing circuit 43 via connection lines 42. The data processing circuit 43 is connected to the driver circuit 8 of the display configuration 6 via a schematically illustrated connection 44. With the credit card 40, at least substantially the same advantages may be achieved as have already been described above with reference to the cell phone 1.

If an external communication station 14 is intended to communicate only with the internal passive device configuration 11 and not also with the internal active device configuration 10, and consequently no use of the first protocol PROT1 (peer-to-peer) is provided and consequently also no first start signal occurs in modified embodiments of the portable devices 1 and 40 according to FIGS. 1 and 2, no PROT1 detection stage 36 will be provided, but rather only the PROT3 detection stage 35 and the PROT2 detection stage 37 will be provided. The two detection stages 35 and 37 in this case may correspondingly form the activator 33, wherein activation of the active device configuration 10 or the passive device configuration 11 may be performed directly by means of the output of each stage 35, 37. That is, in more general terms, the components of the detector 32 may simultaneously form the activator 33.

In the two above-described variant embodiments of a portable device 1 or 40, the detector 32 and the activator 33 are preferably provided on the same circuit board as the internal active device configuration 10 and the internal passive device configuration 11, but as separate circuit units. This does not absolutely have to be the case, because the detector 32 and also the activator 33 may be divided between the internal active device configuration 10 and the internal passive device configuration 11, or because the detector 32 and the activator 33 may be components of either only the internal active device configuration 10 or of only the internal passive device configuration 11.

In the two above-described variant embodiments of a portable device 1 or 40, mutually separate transceivers 21 and 27 are provided for the internal active device configuration 10 and the internal passive device configuration 11. This does not absolutely have to be the case, since two transceiver 21 and 27 may alternatively be formed by a common transmit/receive circuit configuration. In like manner, the memories 25, 30 are illustrated as individual components, although a single memory component can be used to store the data for either configuration 10 or 11, as well as for the telephone processor 3 or other circuits.

It should additionally be mentioned that, instead of transmission coils 17, 20, 22, and 28, which cooperate in the manner of transformers, i.e. inductively, dipoles may be used as antennas if the contactless data transmission is performed in high frequency ranges.

In the two above-described variant embodiments of a portable device 1 or 40, provision is made for external communication stations 14 to be able to communicate in a contactless manner both with the internal passive device configuration 11 and with the internal active device configuration 10. This does not absolutely have to be the case, since external communication stations 14 may communicate with the internal passive device configuration 11 only.

In the two above-described variant embodiments of a portable device 1 or 40, the first transceiver 21 of the internal active device configuration 10 is designed to transmit a controlling search signal. This does not absolutely have to be the case, since provision may also be made for the first transceiver 21 to transmit simply a sinusoidal signal or a square-wave signal as so-called search signal, which serves to transmit energy and which is used after reception in an external data carrier 13 to supply energy to this external data carrier 13, whereupon the external data carrier 13 automatically sends a response signal to the internal active device configuration 10 once a sufficiently high supply voltage has been built up.

A cell phone 1 and a credit card 40 are described above as portable devices. However, the measures according to the invention may also be applied highly advantageously to other portable devices, for example a so-called "Personal Digital Assistant" (PDA) or a laptop computer or a portable dictating device or an electrical dental care configuration or kitchen scales and many other devices.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

The invention claimed is:

1. A portable device comprising:
    an active device configuration, within the portable device, that is configured to provide contactless communication with an external passive data carrier,
    a passive device configuration, within the portable device, that is configured to provide contactless communication with an external active communication station,
    a detector, within the portable device, that is configured to detect a presence of either the external data carrier or the external communication station, and
    an activator, within the portable device, that is configured to selectively activate the active device configuration if the external data carrier is detected, and the passive device configuration if the external communication station is detected.

2. The portable device of claim 1, wherein
the detector is configured to detect a signal from the external communication station that indicates that a peer-to-peer protocol is requested, and
the activator is configured to selectively activate the active device configuration if the peer-to-peer protocol is requested.

3. The portable device of claim 1, wherein
the activator is configured to selectively activate the active device configuration to initiate peer-to-peer communication with the external communication station.

4. The portable device of claim 1, wherein
the passive device configuration includes load modulation of signals received from the external communication station.

5. The portable device of claim 1, wherein
the detector is configured to detect the presence of the external data carrier by detection of load modulation applied to signals transmitted by the portable device.

6. The portable device of claim 1, including
a telephone signal processor that is configured to enable the portable device to provide wireless telephone capabilities.

7. The portable device of claim 1, including
a processor that is configured to enable the portable device to provide Personal Digital Assistant (PDA) capabilities.

8. The portable device of claim 1, including
a processor that is configured to enable the portable device to provide contact communication capabilities.

9. The portable device of claim 1, including
memory that is configured to enable storage of data received from the external data carrier.

10. The portable device of claim 9, including
a display that is configured to display the data received from the external data carrier.

11. The portable device of claim 9, wherein
the memory is configured to enable a buffered transfer of the data received from the external data carrier to the external communication device.

12. The portable device of claim 1, including
memory that is configured to enable storage of data for transmission to the external communication station.

13. The portable device of claim 1, wherein
the active device configuration and the passive device configuration are each configured to provide near field communications in accordance with ISO/IEC Standard 18092.

14. The portable device of claim 1, wherein
the portable device is configured as a card-form data carrier.

15. The portable device of claim 1, including
a controller that is configured to periodically enable the active device configuration to facilitate detection of the external data carrier.

16. The portable device of claim 15, wherein
the controller is configured to periodically enable the passive device configuration to facilitate detection of the external communication device.

17. The portable device of claim 1, including
a display that is configured to display information received by the portable device.

* * * * *